United States Patent [19]

Yoneda et al.

[11] Patent Number: 5,786,096
[45] Date of Patent: Jul. 28, 1998

[54] SURFACE-TREATED SUBSTRATE AND PROCESS FOR ITS PRODUCTION

[75] Inventors: Takashige Yoneda; Fumiaki Gunji; Takeshi Morimoto, all of Yokohama, Japan

[73] Assignee: Asahi Glass Company Ltd., Tokyo, Japan

[21] Appl. No.: 746,482

[22] Filed: Nov. 12, 1996

[51] Int. Cl.$^6$ ............................... B05D 3/02; B32B 9/04
[52] U.S. Cl. ..................... 428/447; 427/387; 428/429; 428/448
[58] Field of Search ......................... 428/429, 447, 428/448; 427/387

[56] References Cited

U.S. PATENT DOCUMENTS

| | | | |
|---|---|---|---|
| 5,314,731 | 5/1994 | Yoneda et al. | 428/429 |
| 5,464,704 | 11/1995 | Yoneda et al. | 428/429 |
| 5,482,768 | 1/1996 | Kawasato et al. | 428/327 |
| 5,576,109 | 11/1996 | Yoneda et al. | 428/447 |
| 5,605,958 | 2/1997 | Yoneda et al. | 524/755 |

Primary Examiner—D. S. Nakarani
Attorney, Agent, or Firm—Oblon, Spivak, McClelland, Maier & Neustadt, P.C.

[57] ABSTRACT

A surface-treated substrate which is a substrate having at least two treated surface layers, wherein the first layer constituting the outermost layer among the treated surface layers is a layer formed by treatment with a surface treating agent containing compound B of the formula (B) as an essential component, and the second layer constituting an underlayer in contact with the outermost layer is a layer formed by treatment with a surface treating agent containing compound A of the formula (A) and $Si(NCO)_4$ as essential components:

$$(R^1)_a(R^2)_b Si(Z)_{4-a-b} \quad (A)$$

$$(R^3)_c(R^4)_d Si(NCO)_{4-c-d} \quad (B)$$

wherein $R^1$ is an organic group, $R^2$ is a hydrogen atom or an organic group, a is 1, 2 or 3, b is 0, 1 or 2, provided that $1 \leq a+b \leq 3$, and Z is an isocyanate group or a hydrolyzable group; and $R^3$ is an organic group, $R^4$ is a hydrogen atom or an organic group, c is 1, 2 or 3, and d is 0, 1 or 2, provided that $1 \leq c+d \leq 3$.

14 Claims, No Drawings

SURFACE-TREATED SUBSTRATE AND PROCESS FOR ITS PRODUCTION

BACKGROUND OF THE INVENTION

1. Field of the Invention

The present invention relates to a surface-treated substrate having excellent water repellency and antifouling properties and a process for its production.

2. Discussion of Background

Substrates made of various materials and various substrates having treated surface layers are used in various fields. However, adverse effects brought by dusts, oil stains or water deposited on the surface of such substrates are problematic.

For example, in transportation equipments such as electric cars, automobiles, ships or aircrafts, the surface of an exterior part such as an outer panel, a window glass, a mirror or a display surface material, an interior part such as an instrument panel, or other articles, is desired to be always clean. If raindrops, dusts or soils are deposited on the surface, or if moisture is condensed thereon by an influence of the temperature or humidity in air, the outer appearance will be impaired. If such a surface is a surface which is directly visually observed or which is directly touched by a person, it may give a filthy impression or may create a hygienic problem.

Further, a stain on an article for a transportation equipment may bring about a deterioration of the function of the article. Especially in a case where the article for the transportation equipment is an article for which transparency or a see-through property is required (such as a window glass or a mirror), a deterioration of the transparency or the see-through property may mean that the purpose intended by the article can not be attained, and may cause a serious accident.

Means to remove such dusts, oil stains or water drops (such as removal by wiping off or by means of a wiper) may sometimes impart fine scratch marks on the surface. Further, such scratch marks may sometimes be widened by foreign particles accompanying such dusts, oil stains or water drops. Furthermore, it is well known that when moisture is attached to a glass surface, glass components are likely to elute into the moisture, whereby the surface will be eroded, thus leading to so-called scorching. If the surface is strongly polished or abraded to remove such scorching, a fine roughness is likely to form. At the see-through portion made of glass having substantial scorching or a fine roughness on its surface, its basic function is lowered, and scattering of light on its surface is substantial, whereby it tends to be difficult to secure the field of view, and there will also be a problem from the viewpoint of safety.

Further, dusts, stains or water drops are likely to give a hazardous influence to the surface of an article for a transportation equipment and to promote damages, soiling, yellowing or corrosion. Otherwise they may induce a change in the electrical characteristics, the mechanical properties or the optical properties of the article for a transportation equipment. Adverse effects of this type are problematic not only in the field of articles for transportation equipments but also in various fields including articles for building or building decoration or articles for electric or electronic equipments.

Under these circumstances, it is strongly desired to develop a technique of imparting to a substrate surface a nature of preventing adhesion of dusts, soils and water drops or a nature whereby attached dusts, stains or water drops can easily be removed (such natures will be referred to hereinafter simply as antifouling properties).

As a method for imparting such antifouling properties, a method has heretofore been proposed wherein a surface treating agent such as silicone wax, silicone oil made of an organopolysiloxane or a surfactant is directly coated on the substrate.

However, conventional surface-treating agents have a drawback that adhesion of the treating agents themselves to the substrates was rather low, and their antifouling properties can not be maintained for a long period of time. Thus, the range of their application has been rather limited.

Further, it is desired to impart such antifouling properties not only to articles to be produced anew but also to articles which have already been used or in which a deterioration in the performance after treatment has been observed. However, to be useful for all of such articles, the surface treating agent must be capable of imparting antifouling properties simply by directly treating such articles with it at a normal temperature. For example, when it is applied to a windshield glass for an automobile which is commercially available, it is practically impossible to replace the windshield glass of each automobile for heat treatment, from the economical reason. Likewise, it is practically impossible to subject the entire automobile to baking after coating. Accordingly, with conventional treating agents, such treatment is difficult or costly.

SUMMARY OF THE INVENTION

It is an object of the present invention to provide a substrate excellent in water repellency and antifouling properties and a process for its production.

The present invention provides a surface-treated substrate which is a substrate having at least two treated surface layers, wherein the first layer constituting the outermost layer among the treated surface layers is a layer formed by treatment with a surface treating agent (hereinafter referred to as treating agent B) containing compound B of the formula (B) as an essential component, and the second layer constituting an underlayer in contact with the outermost layer is a layer formed by treatment with a surface treating agent (hereinafter referred to as treating agent A) containing compound A of the formula (A) and $Si(NCO)_4$ as essential components:

   (A)

   (B)

wherein $R^1$ is an organic group, $R^2$ is a hydrogen atom or an organic group, a is 1, 2 or 3, b is 0, 1 or 2, provided that $1 \leq a+b \leq 3$, and Z is an isocyanate group or a hydrolyzable group; and $R^3$ is an organic group, $R^4$ is a hydrogen atom or an organic group, c is 1, 2 or 3, and d is 0, 1 or 2, provided that $1 \leq c+d \leq 3$; and a process for its production.

DETAILED DESCRIPTION OF THE PREFERRED EMBODIMENTS

In compound A, when a is 2 or 3, the plurality of $R^1$ may be the same or different from one another, and when b is 2, the two $R^2$ may be the same or different from each other. When 4-a-b is 2 or more, the plurality of Z may be all isocyanate groups or hydrolyzable groups, or a combination of isocyanate groups and hydrolyzable groups. When two or more hydrolyzable groups are present, they may be the same or different hydrolyzable groups.

The organic group may be an organic group which contains a halogen atom, a functional group, a connecting group or the like. The organic group is preferably a hydrocarbon group or an organic group containing a halogen atom (hereinafter referred to as a halogenated organic group). The carbon number of the organic group is preferably from 1 to 30.

The hydrocarbon group may be an aliphatic hydrocarbon group or an aromatic hydrocarbon group. However, an aliphatic hydrocarbon group is preferred. As the aliphatic hydrocarbon group, an alkyl group, an alkenyl group or a cycloalkyl group is preferred, and an alkyl group is particularly preferred. Specifically, a methyl group, an ethyl group, a propyl group or a butyl group may, for example, be mentioned. As the aromatic hydrocarbon group, an aryl group is preferred.

As the halogen atom in the halogenated organic group, a chlorine atom, a fluorine atom or a bromine atom is preferred. Among them, a chlorine atom or a fluorine atom is more preferred, and a fluorine atom is particularly preferred.

As the halogenated organic group, a halogenated hydrocarbon group is preferred, and a halogenated alkyl group is particularly preferred. The halogenated alkyl group may, for example, be a chloroalkyl group, a fluoroalkyl group or a chlorofluoroalkyl group.

Further, as the halogenated organic group, a polyfluoroorganic group wherein two or more hydrogen atoms in the organic group are substituted by fluorine atoms, is preferred. As such a polyfluoroorganic group, a polyfluorohydrocarbon group is preferred. Particularly preferred is a polyfluorohydrocarbon group wherein two or more hydrogen atoms in the above hydrocarbon group are substituted by fluorine atoms.

As the polyfluorohydrocarbon group, a polyfluoroalkyl group is particularly preferred. The polyfluoroalkyl group is a group wherein two or more hydrogen atoms of an alkyl group are substituted by fluorine atoms. In the following description, such a polyfluoroalkyl group is represented by $R^f$.

The carbon number of $R^f$ is preferably from 3 to 18. $R^f$ may have a straight chain structure or a branched chain structure. The proportion of fluorine atoms in $R^f$ is preferably such that (the number of fluorine atoms in $R^f$)/(the number of hydrogen atoms in an alkyl group having the same carbon number, which corresponds to $R^f$) is at least 60%, more preferably at least 80%.

Further, $R^f$ may contain an ether-type oxygen atom or a sulfur atom. For example, it may be a polyfluorooxaalkyl group or a polyfluorothioalkyl group. As the polyfluorooxaalkyl group, a group containing a polyfluoroethyleneoxy moiety or a polyfluoropropyleneoxy moiety, or a group containing a polyfluoroethyloxy moiety or a polyfluoropropyloxy moiety, may, for example, be mentioned. Further, as the polyfluorothioalkyl group, a group containing a polyfluoroethylenethio moiety or a polyfluoropropylenethio moiety, or a group containing a polyfluoroethylthio moiety or a polyfluoropropylthio moiety, may, for example, be mentioned.

$R^f$ is preferably a perfluoroalkyl group wherein all hydrogen atoms in the above $R^f$ are substituted by fluorine atoms, a group having a perfluoroalkyl moiety, or a group having a perfluoroalkylene moiety. The perfluoroalkyl group or the perfluoroalkyl moiety preferably has a carbon number of from 3 to 21, and the perfluoroalkylene moiety preferably has a carbon number of from 2 to 18.

Particularly preferred as $R^f$ is a group having a structure in which the above perfluoroalkyl moiety and the alkylene group are connected. It is particularly preferred that $R^f$ is represented by $C_mF_{2m+1}(CH_2)_n$— wherein m is an integer of from 3 to 21, and n is an integer of from 1 to 6, particularly preferably 2.

Z in compound A represents an isocyanate group or a hydrolyzable group. An isocyanate group may sometimes be regarded as a kind of hydrolyzable groups. However, for the purpose of the present invention, an isocyanate group and a hydrolyzable group are regarded as different groups. The isocyanate group or the hydrolyzable group is a structural unit which is very important to increase the adhesion with various substrates when the substrates are treated with compound A. Here, "adhesion" means a chemical or physical bonding state between compound A and the substrate.

The hydrolyzable group may, for example, be an alkoxy group, a halogen atom (chlorine, bromine or iodine), an acyloxy group, an alkoxy-substituted alkoxy group, an aminoxy group, an amide group, an acid amide group or a ketoximate group, preferably an alkoxy group or a halogen atom. The carbon number of the hydrolyzable group is preferably at most 8, more preferably at most 4. Most preferably, it is a $C_{1-4}$ alkoxy group such as a methoxy group, an ethoxy group, a n-propoxy group, an i-propoxy group or a n-butoxy group.

Z in compound A is not particularly limited and may be suitably selected depending upon the particular purpose. Further, in the case of a plurality of Z, they may be the same or different. However, in view of efficiency in the synthesis, they are preferably the same.

When the plurality of Z are different, a hydrolyzable group and an isocyanate group may be coexistent in the molecule, and likewise an isocyanate group and a chlorine atom may be coexistent. Further, different hydrolyzable groups may be coexistent. However, in view of the reactivity of compound A, at least one of the plurality of Z is preferably an isocyanate group. It is particularly preferred that all of Z are isocyanate groups from the viewpoint of the adhesion with a substrate, the safety in the treatment operation, etc.

In the following description, compound A having a structure wherein at least one isocyanate group is present in the molecule of compound A and the isocyanate group is directly bonded to a silicon atom, will be referred to as isocyanate compound A.

In isocyanate compound A, the reactivity of the isocyanate group is very high, and it is considered that the majority of isocyanate groups will be bonded to the surface of the substrate by a chemical reaction when the substrate is treated at a normal temperature. Namely, in the bonded state, the isocyanate group is believed to be modified. For example, the isocyanate group is considered to be reacted with a silanol group of the surface of glass.

In compound A, in view of the adhesion to a substrate, it is preferred that the number of isocyanate groups and/or hydrolyzable groups directly bonded to one silicon atom, is large. It is particularly preferred that the number of isocyanate groups is large. The number of Z is preferably at least 2.

Specific examples of compound A will be shown as (A-1) to (A-35). However, compound A is not limited to such specific examples. In the formulas, Z is an isocyanate group and/or a hydrolyzable group, R' is an organic group, and $R^f$ is a polyfluoroalkyl group.

As compound A, one or more of such compounds may be used. Further, in a case where compound A is a compound containing $R^f$, it is possible to use two or more compounds which are different in the number of carbon atoms in R$^f$.

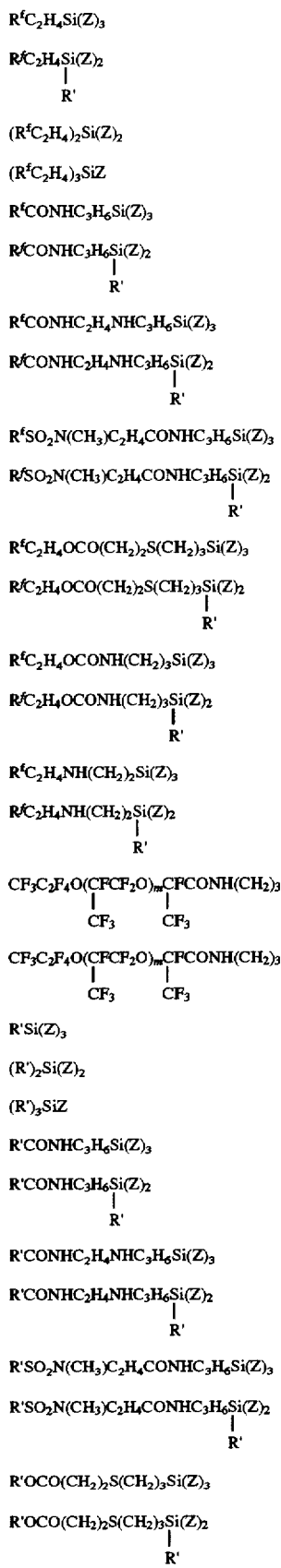
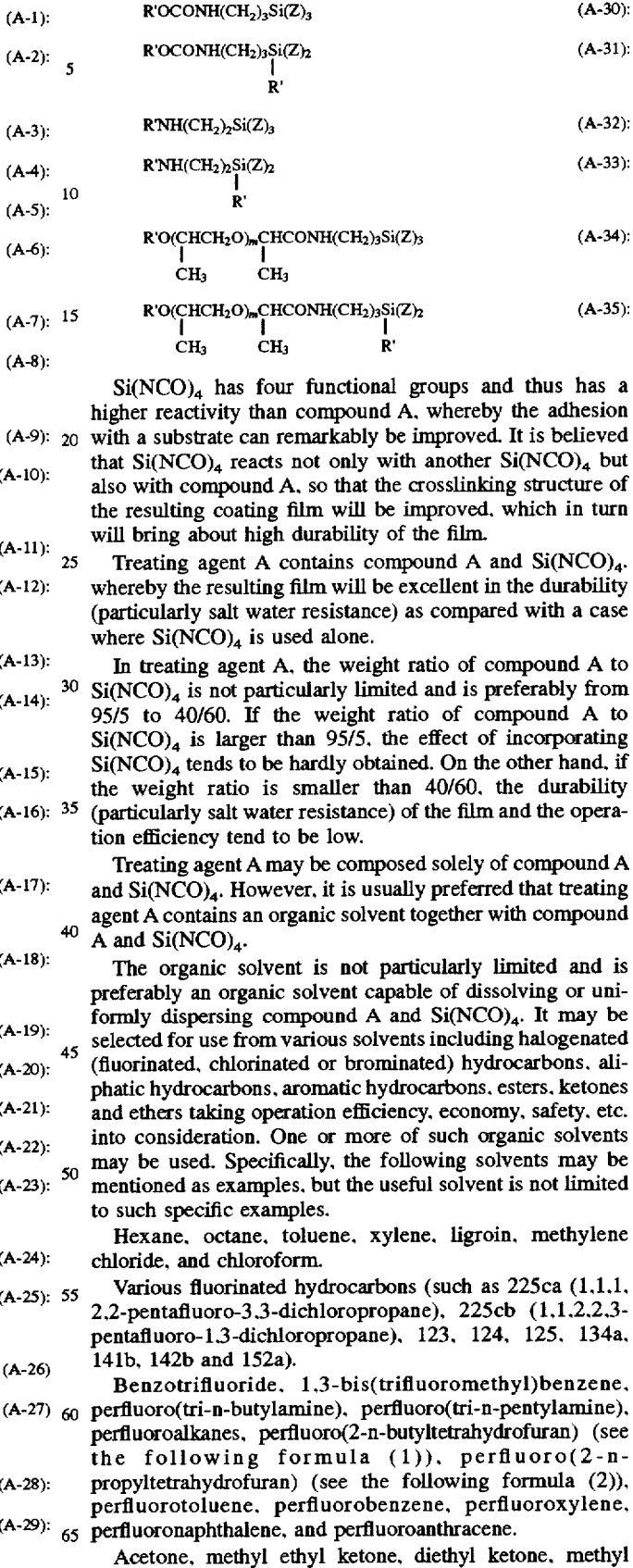

Si(NCO)$_4$ has four functional groups and thus has a higher reactivity than compound A, whereby the adhesion with a substrate can remarkably be improved. It is believed that Si(NCO)$_4$ reacts not only with another Si(NCO)$_4$ but also with compound A, so that the crosslinking structure of the resulting coating film will be improved, which in turn will bring about high durability of the film.

Treating agent A contains compound A and Si(NCO)$_4$, whereby the resulting film will be excellent in the durability (particularly salt water resistance) as compared with a case where Si(NCO)$_4$ is used alone.

In treating agent A, the weight ratio of compound A to Si(NCO)$_4$ is not particularly limited and is preferably from 95/5 to 40/60. If the weight ratio of compound A to Si(NCO)$_4$ is larger than 95/5, the effect of incorporating Si(NCO)$_4$ tends to be hardly obtained. On the other hand, if the weight ratio is smaller than 40/60, the durability (particularly salt water resistance) of the film and the operation efficiency tend to be low.

Treating agent A may be composed solely of compound A and Si(NCO)$_4$. However, it is usually preferred that treating agent A contains an organic solvent together with compound A and Si(NCO)$_4$.

The organic solvent is not particularly limited and is preferably an organic solvent capable of dissolving or uniformly dispersing compound A and Si(NCO)$_4$. It may be selected for use from various solvents including halogenated (fluorinated, chlorinated or brominated) hydrocarbons, aliphatic hydrocarbons, aromatic hydrocarbons, esters, ketones and ethers taking operation efficiency, economy, safety, etc. into consideration. One or more of such organic solvents may be used. Specifically, the following solvents may be mentioned as examples, but the useful solvent is not limited to such specific examples.

Hexane, octane, toluene, xylene, ligroin, methylene chloride, and chloroform.

Various fluorinated hydrocarbons (such as 225ca (1,1,1,2,2-pentafluoro-3,3-dichloropropane), 225cb (1,1,2,2,3-pentafluoro-1,3-dichloropropane), 123, 124, 125, 134a, 141b, 142b and 152a).

Benzotrifluoride, 1,3-bis(trifluoromethyl)benzene, perfluoro(tri-n-butylamine), perfluoro(tri-n-pentylamine), perfluoroalkanes, perfluoro(2-n-butyltetrahydrofuran) (see the following formula (1)), perfluoro(2-n-propyltetrahydrofuran) (see the following formula (2)), perfluorotoluene, perfluorobenzene, perfluoroxylene, perfluoronaphthalene, and perfluoroanthracene.

Acetone, methyl ethyl ketone, diethyl ketone, methyl isobutyl ketone, cyclohexanone, acetyl acetone, dibutyl ether, 1,4-dioxane, dihexyl ether, ethylene glycol diethyl ether, ethylene glycol dibutyl ether, diethylene glycol diethyl ether, diethylene glycol dibutyl ether, ethyl acetate, butyl acetate, butyl propionate, ethyl butyrate, butyl butyrate, and ethyl acetoacetate.

Ethylene glycol monomethyl ether acetate (CH₃COOCH₂CH₂OCH₃), ethylene glycol monoethyl ether acetate (CH₃COOCH₂CH₂OC₂H₅), diethylene glycol monoethyl ether acetate (CH₃COOCH₂CH₂OCH₂CH₂OC₂H₅), diethylene glycol monobutyl ether acetate (CH₃COOCH₂CH₂OCH₂CH₂OC₄H₉), and glycol diacetate (CH₃COOCH₂CH₂OCOCH₃).

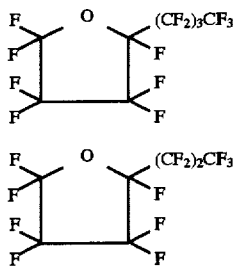

Particularly preferred from the viewpoint of the stability of liquid, safety, operation efficiency and economy, are acetic acid esters, butyric acid esters, ethers, and halogenated (particularly fluorinated) hydrocarbons.

When compound A has an isocyanate group, an organic solvent having reactive hydrogen atoms, is not desirable, since it reacts with the isocyanate group of compound A. However, for the purpose of improving wettability, a solvent such as an alcohol may be added in a small amount.

The organic solvent is used preferably in such an amount that the amount of compound A will be from 0.1 to 30 parts by weight, per 100 parts by weight of the organic solvent, from the viewpoint of the film forming property (operation efficiency), safety, film thickness and economy.

Treating agent A may contain other compounds and additives depending upon the particular purpose. Such other additives may be selected for use taking the reactivity and compatibility with various components into consideration. Ultrafine particles of various metal oxides or various resins may also be added. If coloring is required, dyes, pigments or the like may further be added. Such additives are usually incorporated in an amount of from 0.1 to 20 parts by weight per 100 parts by weight of compound A. If the amount of such additives is excessive, the antifouling properties or abrasion resistance of treating agent A tends to be low, such being undesirable.

Further, if electrical conductivity is required, a material whereby a desired level of resistance is obtainable depending upon the particular purpose (such as tin oxide, ITO (In₂O₃—SnO₂) or zinc oxide), may be added. The amount of such an additive may be determined depending upon the desired level of resistance and the material.

Prior to treatment with treating agent A, pretreatment may be applied as the case requires. For example, pretreatment such as polishing treatment by means of cerium oxide, sandblast treatment, acid treatment with hydrofluoric acid, sulfuric acid, nitric acid or hydrochloric acid, alkali treatment with an aqueous solution of sodium hydroxide or potassium hydroxide, or discharge treatment by means of e.g. plasma irradiation, may be carried out. Otherwise, the treatment may be carried out without applying such pretreatment.

The method of treating with treating agent A is not particularly limited. Usually, various conventional treating methods may be employed. As a coating method, various methods may be mentioned including brush coating, casting, rotational coating, dip coating and spray coating. Then, the coating thereby formed is dried in atmospheric air or in a nitrogen atmosphere to form a coating film.

Each of the above treatments, can be conducted at a normal temperature which is preferably from 20° to 30° C. The drying time is usually from 10 minutes to 5 hours, preferably from 20 minutes to 2 hours.

Further, for the purpose of accelerating the drying speed, heating may be applied. When heating is applied, the heating temperature and time may be set at levels where the heat resistance of the substrate can be maintained. Further, it is also preferred that the coating substrate is left in a high humidity (e.g. at least 50%) environment for drying.

The thickness of the coating film formed by treating the substrate with treating agent A, is suitably controlled by e.g. the concentration of the solid content in the treating agent, the coating conditions, the heating conditions, etc., and it is not particularly limited. In a usual case, the thickness of the coating film may theoretically be at least a single molecular layer to provide antifouling properties, and it is usually preferred to be at most 2 μm from the viewpoint of economical effects.

In the present invention, a surface treating agent (treating agent B) containing compound B of the above formula (B), is applied on the coating film obtained by treating agent A, to form the outermost layer to improve the durability.

In compound B, when c is 2 or 3, the plurality of $R^3$ may be the same or different from one another, and when d is 2, two $R^4$ may be the same or different from each other.

The organic group may be an organic group which contains a halogen atom, a functional group, a connecting group or the like. The organic group is preferably a hydrocarbon group or a halogenated organic group. The carbon number of the organic group is preferably from 1 to 30.

The hydrocarbon group may be an aliphatic hydrocarbon group or an aromatic hydrocarbon group. However, an aliphatic hydrocarbon group is preferred. As the aliphatic hydrocarbon group, an alkyl group, an alkenyl group or a cycloalkyl group is preferred, and an alkyl group is particularly preferred. Specifically, a methyl group, an ethyl group, a propyl group or a butyl group may, for example, be mentioned. As the aromatic hydrocarbon group, an aryl group is preferred.

As the halogen atom in the halogenated organic group, a chlorine atom, a fluorine atom or a bromine atom is preferred. Among them, a chlorine atom or a fluorine atom is more preferred, and a fluorine atom is particularly preferred.

As the halogenated organic group, a halogenated hydrocarbon group is preferred, and a halogenated alkyl group is particularly preferred. The halogenated alkyl group may, for example, be a chloroalkyl group, a fluoroalkyl group or a chlorofluoroalkyl group.

Further, as the halogenated organic group, a polyfluoroorganic group wherein two or more hydrogen atoms in the organic group are substituted by fluorine atoms, is preferred. As such a polyfluoroorganic group, a polyfluorohydrocarbon group is preferred. Particularly preferred is a polyfluorohydrocarbon group wherein two or more hydrogen atoms in the above hydrocarbon group are substituted by fluorine atoms. Particularly preferred as a polyfluorohydrocarbon group is $R^f$.

The carbon number of $R^f$ is preferably from 3 to 18. $R^f$ may have a straight chain structure or a branched chain structure. The proportion of fluorine atoms in $R^f$ is preferably such that (the number of fluorine atoms in $R^f$)/(the number of hydrogen atoms in an alkyl group having the same carbon number, which corresponds to $R^f$) is at least 60%, more preferably at least 80%.

Further, $R^f$ may contain an ether-type oxygen atom or a sulfur atom. For example, it may be a polyfluorooxaalkyl group or a polyfluorothioalkyl group. As the polyfluorooxaalkyl group, a group containing a polyfluoroethyleneoxy moiety or a polyfluoropropyleneoxy moiety, or a group containing a polyfluoroethyloxy moiety or a polyfluoropropyloxy moiety, may, for example, be mentioned. Further, as the polyfluorothioalkyl group, a group containing a polyfluoroethylenethio moiety or a polyfluoropropylenethio moiety, or a group containing a polyfluoroethylthio moiety or a polyfluoropropylthio moiety, may, for example, be mentioned.

$R^f$ is preferably a perfluoroalkyl group wherein all hydrogen atoms in the above $R^f$ are substituted by fluorine atoms, a group having a perfluoroalkyl moiety, or a group having a perfluoroalkylene moiety. The perfluoroalkyl group or the perfluoroalkyl moiety preferably has a carbon number of from 3 to 21, and the perfluoroalkylene moiety preferably has a carbon number of from 2 to 18.

Particularly preferred as $R^f$ is a group having a structure in which the above perfluoroalkyl moiety and the alkylene group are connected. It is particularly preferred that $R^f$ is represented by $C_mF_{2m+1}(CH_2)n-$ wherein m is an integer of from 3 to 21, and n is an integer of from 1 to 6, particularly preferably 2.

The isocyanate group in compound B is a structural unit which is very important to increase the adhesion when compound B is applied on the surface of the coating film formed by the above-described treating agent A. Here, "adhesion" means a chemical or physical bonding state between compound B and the coating film surface formed by treating agent A.

In compound B, the reactivity of the isocyanate group is very high, and it is considered that the majority of isocyanate groups will be bonded by a chemical reaction when the treatment is carried out at a normal temperature. Namely, in the bonded state, the isocyanate group is believed to be modified. For example, the isocyanate group is considered to be reacted with a silanol group of the surface formed by treating agent A.

In compound B, in view of the adhesion to the coating film formed by treating agent A, it is preferred that the number of isocyanate groups directly bonded to one silicon atom, is large, and such a number is preferably at least 2.

It is considered that on the outermost surface of the coating film formed by treating agent A, unreacted groups (Si—NCO groups) of compound A and $Si(NCO)_4$ (mostly of $Si(NCO)_4$) are present as they are, or in the form reacted with moisture in air (i.e. in the form of Si—OH groups). Accordingly, it is considered that when treating agent B is applied to the surface of the coating film formed by treating agent A, such Si—NCO groups or Si—OH groups will serve as starting points of reaction, and that compound B and the coating film formed by treating agent A will adhere firmly to each other, and the effective film thickness will be thick, whereby the durability performance of the film will be remarkably improved. Further, good results can be obtained also from the viewpoint of the durability (particularly salt water resistance).

Compound B is a substance having a low surface free energy, and it is considered that compound B present in a free state in a very small amount in the coating film will move in the surface layer, whereby the frictional resistance at the surface is reduced to provide excellent abrasion resistance.

Usually, compound B is preferably dissolved or dispersed in an organic solvent from the viewpoint of the operation efficiency and economy.

The organic solvent is not particularly limited, and it is preferably the one capable of dissolving or uniformly dispersing compound B. Various solvents including halogenated (fluorinated, chlorinated or brominated) hydrocarbons, aromatic hydrocarbons, esters, ketones and ethers may be employed. Such organic solvents may be used alone or in combination as a mixture of two or more of them.

Particularly preferred are acetic acid esters or fluorine-containing solvents such as 225ca, 225cb, perfluoro(tri-n-butylamine), perfluoro(tri-n-pentylamine), perfluoroalkane, perfluorobenzene, perfluoroxylene, perfluoronaphthalene, perfluoroanthracene, perfluorotoluene, perfluoro(2-n-butyltetrahydrofuran), perfluoro(2-n-propyltetrahydrofuran), benzotrifluoride, and 1,3-bis(trifluoromethyl)benzene.

An organic solvent having a reactive hydrogen atom is not desirable, since it reacts with an isocyanate group of compound B. However, such an organic solvent may be added in a small amount for the purpose of improving the wettability.

The amount of the organic solvent is preferably in such an amount that the amount of compound B would be from 0.1 to 30 parts by weight per 100 parts by weight of the organic solvent, from the viewpoint of the film-forming property (operation efficiency), stability, film thickness and economy.

Treating agent B may contain other compounds or additives as the case requires. As such additives, the additives as mentioned above with respect to compound A and $Si(NCO)_4$, may be likewise used.

The method for applying treating agent B to the coating film formed by treating agent A is not particularly limited. Usually, various conventional treating methods may be employed. As the coating method, various methods may be mentioned including brush coating, casting, rotational coating, dip coating and spray coating. Then, it is dried in atmospheric air or in a nitrogen atmosphere to form a coating film.

Each of the above treatments can be conducted at a normal temperature which is preferably from 20° to 30° C. The drying time is usually from 10 minutes to 5 hours, preferably from 20 minutes to 2 hours. For the purpose of e.g. increasing the drying speed, heating may be applied. When heating is applied, the heating temperature and time may be set at levels where the heat resistance of the substrate can be maintained. Further, it is also preferred that the coated substrate is left in a high humidity (e.g. at least 50%) environment for drying.

The thickness of the coating film formed by treating the substrate with compound B, is suitably controlled by e.g. the concentration of the solid content in the treating agent, the coating conditions, the heating conditions, etc., and it is not particularly limited. In a usual case, the thickness of the coating film may theoretically be at least a single molecular layer to provide antifouling properties, and it is usually preferably at most 2 μm from the viewpoint of economical effects.

The film thickness in total of the layer formed by compound A and $Si(NCO)_4$ and the layer formed by compound B, is also preferably at most 2 μm from the viewpoint of economical effects.

As specific examples of compound B, compounds corresponding to compounds of the formulas (A-1) to (A-35) wherein Z is an isocyanate group, may be mentioned. Compound B may be the same or different from compound A. As compound B, one or more compounds may be used. In a case where compound B contains $R^f$, at least two compounds differing in the carbon number of $R^f$ may be used in combination.

The substrate of the present invention is not particularly limited, and the present invention may be applied, for example, to metals, plastics, ceramics, glass, other inorganic materials, organic materials, or combinations thereof (such as composite materials, laminated materials, etc.) Further, the surface of the substrate may be not only the surface of the substrate itself, but also the surface of material different from the substrate, such as a coating film surface of e.g. a coated metal plate, or the surface of a surface-treated layer of e.g. surface-treated glass (such as the surface provided with e.g. a sol gel film, a sputtered film, a CVD film or a vapor-deposited film).

The shape of the substrate is not particularly limited. It may, for example, be flat or may have an optional shape depending upon the particular purpose, such as the one having a curvature over the entire surface or at a part thereof.

In the present invention, it is preferred to employ a substrate made of a transparent material such as glass or plastic. Further, it is preferably employed for articles for transportation equipments or articles for buildings or building decorations.

Articles for transportation equipments may be exterior parts such as outer plates, window glasses, mirrors and display panels, and interior parts such as instrument panels, of the transportation equipments such as electric cars, buses, trucks, automobiles, ships or aircrafts, or parts or constituting elements to be used in other transportation equipments.

For example, the articles for transportation equipments include bodies, window glasses, pantagraphs, etc. of electric cars, bodies, windshields, side glasses, rear glasses, mirrors, bumpers, etc. of automobiles, buses or trucks, bodies, window glasses, etc. of ships, and bodies, window glasses, etc. of aircrafts.

Such an article may be composed solely of the surface-treated substrate or may have the surface-treated substrate incorporated therein. For example, the former may be a window glass for an automobile, and the latter may be a back mirror for an automobile in which a glass mirror is incorporated.

With such substrates or articles, water drops on the surface will be repelled by the water repellency. Especially, during driving, due to the interaction with the receiving wind pressure, water drops rapidly move on the surface and will not remain as water drops, whereby any adverse effect which may otherwise be induced by moisture, can be eliminated. Especially in the application to a see-through portion such as a window glass, it becomes easy to secure a viewing field due to dissipation of water drops, thus leading to improvement of the safety of a vehicle.

Further, in an environment where water drops usually freeze, no freezing takes place, or even if freezing takes place, the frozen drops can readily be defrosted. Further, there will be no substantial deposition of water drops, whereby the number of periodical cleaning operations can be reduced. Besides, the cleaning operation is very easy, such being advantageous also for the protection of good appearance.

Further, the articles for buildings or building decorations may be articles to be attached to buildings or articles already attached to buildings, or articles for buildings which are not attached to buildings but which are used for the buildings, or articles for buildings such as furnitures or equipments.

For example, they include window glasses, glass plates for roofs, various roofs including glass roofs, glass plates for doors or doors having such glass plates installed, glass plates for partitions, glass plates for green houses, or green houses having such glass plates, window materials or roof materials using transparent plastic plates, wall materials made of ceramics, cement, metals or other materials, mirrors, furnitures having such mirrors, and glass for display shelves or showcases.

Such an article may be made of the surface treated substrate alone or may be the one having the surface treated substrate incorporated therein. For example, the former may be a window glass plate, and the latter may be a furniture in which a glass mirror is incorporated.

With such a surface treated substrate, water drops which are brought in contact with the surface are repelled due to the water repellency and scarcely attach to the surface, or if attached, the amount is small and the attached water drops can easily be removed. Further, even in an environment where water drops usually freeze, no freezing takes place, or even if freezing takes place, the frozen drops can readily be defrosted. Further, there will be no substantial deposition of water drops, whereby the number of periodical cleaning operations can be reduced, and each cleaning operation will be very easy, and such being advantageous also from the viewpoint of the protection of good appearance.

Treating agent A has a merit in that it provides the desired performance by normal temperature treatment. Further, it requires no pretreatment or post-treatment, whereby treatment can readily be carried out. Accordingly, it can be applied not only to a new substrate but also to a substrate which has already been used for some application. Further, it can also be used for repairing in a case where after application of treating agent A, the performance of the coating film has deteriorated for some reason.

Now, the present invention will be described in further detail with reference to Examples. However, it should be understood that the present invention is by no means restricted to such specific Examples. Examples 1 to 5 and Examples 11 to 22 represent Examples of the present invention, and Examples 6 to 10 represent Comparative Examples.

In the following Examples, the evaluation methods for antifouling properties, antifouling durability and antifouling properties after a salt spray test, were as follows.

Evaluation method for antifouling properties a) The contact angle of water was measured.

b) The contact angle of hexadecane ($C_{16}H_{34}$) was measured.

c) The finger print removal properties were evaluated by the following method. Namely, finger prints were put on the treated surface and wiped with a cotton cloth for 20 reciprocal strokes, whereupon the appearance was inspected and evaluated by the following standards:

A: Oil stains completely and cleanly wiped off.

B: Oil stains slightly remain.

C: Oil stains substantially remain.

d) The water drop remaining degree was evaluated by the following method. Namely, from a nozzle held in a distance of 20 cm from a vertically held plate sample, water was sprayed over the entire surface of the sample for about 1 hour, whereupon water drops remaining on the surface were visually observed and evaluated in accordance with the following evaluation standards:

A: No water remains on the sample surface.

B: Water slightly remains on the sample surface.

C: Water drops remain in a substantial amount on the sample surface.

D: Water spread wettingly on the sample surface.

Evaluation method for the antifouling durability

A sample was immersed in boiling water for 6 hours, whereupon c) the finger print removal properties and d) the water drop remaining degree were evaluated.

Evaluation method for the antifouling properties after a salt spray test

A sample glass was subjected to a salt spray test for 150 hours in accordance with JIS Z2371, whereupon the antifouling properties of the sample glass were evaluated.

In Tables, "FP" and "WD" mean the finger print removal properties and the water drop remaining degree, respectively.

EXAMPLE 1

Into a flask equipped with a stirrer and a thermometer, 97.0 g of n-butyl acetate, 2.4 g of $C_8F_{17}C_2H_4Si(NCO)_3$ and 0.6 g of $Si(NCO)_4$ were introduced in this order. While maintaining the liquid temperature of this solution at 25° C., stirring was continued for 1 day to obtain treating agent A-1.

On the other hand, into a flask equipped with a stirrer and a thermometer, 97.0 g of n-butyl acetate and 3.0 g of $C_8F_{17}C_2H_4Si(NCO)_3$ were introduced in this order. While maintaining the liquid temperature of this solution at 25° C., stirring was continued for 1 day to obtain treating agent B-1.

1 cc of treating agent A-1 was dropped on a glass plate (10 cm×10 cm×2 mm in thickness) which was preliminarily cleaned by polishing with cerium oxide, and spread by a JK wiper (product manufactured by Jujo Kimberly K.K.) in a manner similar to waxing an automobile. The coating efficiency at that time was evaluated in accordance with the following standards:

○: Easily spread without difficulty.

Δ: Slight labor is required for spreading

X: Substantial labor is required for spreading. The results of the evaluation of the coating efficiency are shown in Table 1.

Then, this plate was left to stand for 1 hour at 25° C. under a humidity of 50%, whereupon 1 cc of treating agent B-1 was dropped on the treated surface and spread by a JK wiper in the same manner as described above. Thereafter, it was left to stand for 1 day to obtain a sample glass. The antifouling properties, the antifouling durability and the antifouling properties after a salt spray test of the obtained sample glass were evaluated, and the results are shown in Table 2. In Table 2, "good" in the column for "AP i.e. appearance" means "good appearance".

EXAMPLE 2

Treating agent A-2 was prepared in the same manner as in Example 1 except that 1.5 g of $C_8F_{17}C_2H_4Si(NCO)_3$ and 1.5 g of $Si(NCO)_4$ were used instead of 2.4 g of $C_8F_{17}C_2H_4Si(NCO)_3$ and 0.6 g of $Si(NCO)_4$. Then, a sample glass was prepared in the same manner as in Example 1 except that treating agent A-2 was used instead of treating agent A-1, whereupon the coating efficiency, the antifouling properties, the antifouling durability and the antifouling properties after a salt spray test were evaluated. The results are shown in Table 2.

EXAMPLES 3 TO 5

Sample glasses were, respectively, prepared in the same manner as in Example 2 except that instead of treating agent A-2, treating agents as identified in the column for "underlayer" in Table 1, were used, and evaluation was carried out in the same manner. The results are shown in Table 2.

EXAMPLE 6

The treating agent for underlayer was coated in the same manner as in Example 3 and then left to stand for 1 day, to obtain a sample glass. Evaluation was carried out in the same manner as in Example 1. The results are shown in Table 2.

EXAMPLE 7

No treatment was applied to the same glass plate as used in Example 1, and evaluation was carried out in the same manner as in Example 1. The results are shown in Table 2.

EXAMPLES 8 AND 9

Samples glasses were prepared in the same manner as in Example 6 except that treating agents as identified in the column for "underlayer" in Table 1, were used, and evaluation was carried out in the same manner. The results are shown in Table 2.

EXAMPLE 10

A sample glass was prepared in the same manner as in Example 1 except that instead of treating agent A-1, a treating agent as identified in the column for "underlayer" in Table 1, was used, and instead of treating agent B-1, a treating agent as identified in the column for "upperlayer" in Table 1, was used, and evaluation was carried out in the same manner. The results are shown in Table 2.

EXAMPLE 11

Into a flask equipped with a stirrer and a thermometer, 29.1 g of n-butyl acetate, 2.4 g of $C_8F_{17}C_2H_4Si(NCO)_3$, 0.6 of $Si(NCO)_4$ and 67.9 g of 1,3-bis(trifluoromethyl)benzene were introduced in this order. While maintaining the liquid temperature of this solution at 25° C., stirring was continued for 1 day to obtain treating agent A-3.

On the other hand, into a flask equipped with a stirrer and a thermometer, 97.0 g of $N(n-C_4F_9)_3$ and 3.0 g of $C_8F_{17}C_2H_4Si(NCO)_3$ were introduced in this order. While maintaining the liquid temperature of the solution at 25° C., stirring was continued for 1 day to obtain treating agent B-2.

Then, a sample glass was prepared in the same manner as in Example 1 except that instead of A-1, treating agent A-3 was used, and instead of treating agent B-1, treating agent B-2 was used, whereupon the coating efficiency, the antifouling properties, the antifouling durability and the antifouling properties after a salt spray test were evaluated. The results are shown in Table 2.

EXAMPLES 12 TO 15

Sample glasses were, respectively, prepared in the same manner as in Example 11 except that instead of treating agent A-3, treating agents as identified in the column for "underlayer" in Table 1 were used, and instead of treating agent B-2, treating agents as identified in the column for "upperlayer" in Table 1, were used, and evaluation was carried out in the same manner. The results are shown in Table 2.

EXAMPLE 16

The sample glass of Example 1 was immersed in a reagent as identified in Table 3 for 24 hours, then taken out and immediately washed, whereupon the change in appearance, the finger print removal properties and the water drop remaining degree of this sample were evaluated. The results are shown in Table 3.

EXAMPLE 17

The sample glass of Example 1 was subjected to reciprocal abrasion for 20,000 times with a flannel cloth under a load of 1 kg. After the abrasion test, the antifouling properties were evaluated, and the results are shown in Table 4.

EXAMPLE 18

The sample glass of Example 1 was subjected to a weather resistant test for 250 cycles, in which one cycle consisted of ultraviolet irradiation for 8 hours (70° C.) and humidity exposure for 4 hours (50° C.). After the weather resistant test, the antifouling properties were evaluated, and the results are shown in Table 4.

EXAMPLE 19

The surface of a laminated front glass for an automobile was treated in the same manner as in Example 1, and the windshield was mounted on an automobile. This automobile was subjected to a running test for 4 hours during a day time and for 2 hours during night every day for 1 month, whereby deposition of soil or dust on the surface of the front glass was visually observed every day, and deposition of water droplets was visually observed when it rained.

As a result, no deposition of soil or dust, or no formation of fur due to deposition of water droplets, was observed, and even when observed, such deposition or formation was readily removed by gentle wiping with a tissue paper.

Further, at the time of raining, water drops on the surface were repelled and readily moved away by an interaction with wind pressure by running, whereby the visual field was secured without using a wiper. Further, in a running test under an environment (0° C. to −5° C.) in which water drops deposited on a non-treated laminated front glass would freeze or in which moisture in air would condense and frost on a front glass, no freezing or frosting on the front glass was observed.

Then, under a severer low temperature environment (−10° C. to −15° C.), frosting was observed on the front glass, but the defrosting was quick, and it was confirmed that the treated glass had excellent performance as compared with the non-treated front glass.

EXAMPLE 20

The running test was carried out in the same manner as in Example 19 except that the laminated front glass in Example 19 was changed to a side glass, a rear glass or a side mirror, whereby the same effects as in Example 19 were confirmed.

EXAMPLE 21

The laminated front glass of an automobile used for more than 3 years, was polished with cerium oxide, washed with water and dried. Then, 10 cc of the solution of treating agent A-1 was dropped on the cleaned laminated front glass, then spread by a JK wiper in a manner similar to waxing an automobile, and left to stand for 1 hour. At that time, the temperature was 19° C., and the humidity was 46%. Further, 10 cc of treating agent B-1 was dropped on the treated surface, then spread by a JK wiper in a manner similar to waxing an automobile and left to stand for 1 day. Using this automobile, the same tests as in Example 19 were carried out, whereby the same effects as in Example 19 were confirmed.

EXAMPLE 22

The surface of a window glass for building was treated in the same manner as in Example 1 to form a coating film. The window glass thus obtained was attached to a house. Deposition of soil and dust on the surface of this window glass as well as deposition of water droplets when it rained, were visually observed.

As a result, no deposition of soil or dust, or no formation of fur due to deposition of water droplets was observed, and if observed, such deposition or formation was readily removed by gently wiping with tissue paper. Further, at the time of raining, water drops on the surface were repelled and fell off, and especially when a strong wind blew, the water drops were readily moved away by the interaction with the wind pressure, whereby visual field was secured. Further, in a test in an environment (0° C. to −5° C.) in which water droplets deposited on a non-treated window glass would freeze, or moisture in air would condense and frost on a window glass, no freezing or frosting on the window glass was observed.

Then, under a severer low temperature environment (−10° C. to −15° C.), frosting on the window glass was observed, but defrosting was quick, and the treated glass was found to provide excellent performance as compared with the non-treated window glass.

TABLE 1

| Example | Underlayer (g) | Coating efficiency | Upperlayer (g) |
|---|---|---|---|
| 1 | P-2.4, Y-0.6, BA-97.0 | ○ | P-3.0, BA-97.0 |
| 2 | P-1.5, Y-1.5, BA-97.0 | ○ | P-3.0, BA-97.0 |
| 3 | P-0.6, Y-2.4, BA-97.0 | Δ | P-3.0, BA-97.0 |
| 4 | Q-1.5, Y-1.5, BA-97.0 | ○ | P-3.0, BA-97.0 |
| 5 | R-1.5, Y-1.5, BA-97.0 | ○ | P-3.0, BA-97.0 |
| 6 | P-0.6, Y-2.4, BA-97.0 | Δ | — |
| 7 | — | — | — |
| 8 | P-3.0, EA-97.0 | ○ | — |
| 9 | Y-3.0, EA-97.0 | Δ | — |
| 10 | Y-3.0, EA-97.0 | Δ | P-3.0, EA-97.0 |
| 11 | P-2.4, Y-0.6, BA-29.1, MB-67.9 | ○ | P-3.0, BN-97.0 |
| 12 | P-2.4, Y-0.6, BA-29.1, MB-67.9 | ○ | S-3.0, BN-97.0 |
| 13 | P-2.4, Y-0.6, BA-29.1, MB-67.9 | ○ | T-3.0, EA-97.0 |
| 14 | U-2.4, Y-0.6, BA-97.0 | ○ | P-3.0, BN-97.0 |
| 15 | U-2.4, Y-0.6, BA-97.0 | ○ | T-3.0, EA-97.0 |

P: $C_8F_{17}C_2H_4Si(NCO)_3$, Q: $C_8F_{17}C_2H_4Si(OCH_3)_3$
R: $C_8F_{17}C_2H_4SiCl_3$
S: $C_nF_{2n+1}C_2H_4Si(NCO)_3$
(Mixture of compounds wherein n is 6, 8, 10 and 12, the average value of n being 9.)
T: $C_{18}H_{37}Si(NCO)_3$, U: $C_8H_{17}Si(NCO)_3$, Y: $Si(NCO)_4$
BA: $n-C_4H_9OCOCH_3$, EA: $C_2H_5OCOCH_3$, BN: $(n-C_4F_9)_3N$
MB: 1,3-Bis(trifluoromethyl)benzene

TABLE 2

| Example | Antifouling properties | | | | | Antifouling durability | | Antifouling properties after the salt spray test | | | | |
|---|---|---|---|---|---|---|---|---|---|---|---|---|
| | AP | CA $C_{16}H_{34}$ | CA $H_2O$ | FP | WD | FP | WD | AP | CA $C_{16}H_{34}$ | CA $H_2O$ | FP | WD |
| 1 | Good | 74° | 116° | A | A | A | A | Good | 61° | 102° | A | A |
| 2 | Good | 74° | 114° | A | A | A | A | Good | 58° | 100° | A | A |
| 3 | Good | 73° | 115° | A | A | A | A | Good | 56° | 94° | B | A |
| 4 | Good | 71° | 114° | A | A | A | A | Good | 55° | 91° | B | A |
| 5 | Good | 73° | 113° | A | A | A | A | Good | 56° | 93° | B | A |
| 6 | Good | 67° | 110° | A | A | B | B | Good | 42° | 67° | C | B |
| 7 | Good | 5° | 10° | C | D | C | D | — | — | — | — | — |
| 8 | Good | 67° | 109° | A | A | C | B | Good | 38° | 59° | C | C |
| 9 | Good | 11° | 10° | C | D | C | D | — | — | — | — | — |
| 10 | Good | 70° | 109° | A | A | B | A | Good | 55° | 89° | B | B |
| 11 | Good | 73° | 114° | A | A | A | A | Good | 60° | 101° | A | A |
| 12 | Good | 73° | 115° | A | A | A | A | Good | 61° | 103° | A | A |
| 13 | Good | 64° | 110° | A | A | A | A | Good | 54° | 93° | B | A |
| 14 | Good | 70° | 113° | A | A | B | A | Good | 53° | 93° | B | A |
| 15 | Good | 61° | 108° | A | A | B | A | Good | 52° | 92° | B | A |

AP: appearance, CA: contact angle, FP: finger print removal properties, WD: water drop remaining degree

TABLE 3

| Example | Reagent | Appearance | FP | WD |
|---|---|---|---|---|
| 16 | Methanol | No change | A | A |
| | Acetone | No change | A | A |
| | 1% sulfuric acid aqueous solution | No change | A | A |
| | 1% sodium hydroxide aqueous solution | No change | A | A |
| | Gasoline | No change | A | A |

FP: finger print removal properties
WD: water drop remaining degree

TABLE 4

| Example | Appearance | Contact angle $C_{16}H_{34}$ | Contact angle $H_2O$ | FP | WD |
|---|---|---|---|---|---|
| 17 | Good | 65° | 104° | A | A |
| 18 | Good | 64° | 101° | A | A |

FP: finger print removal properties
WD: water drop remaining degree

The present invention provides the following excellent effects.

(1) According to the process of the present invention, it is possible to carry out treatment at normal temperature and to impart excellent antifouling properties to a substrate. Accordingly, it is useful not only for treatment of an article produced anew but also for treatment of an article which has already been used. Further, it requires no heat treatment, whereby it may be applied to a necessary portion without deforming the shape of the article to be treated.

(2) The present invention is applicable not only to glass but also to a wide range of other substrates. Further, no special pretreatment is required for the application, and continuous treatment can be done, which is economically advantageous.

(3) The substrate of the present invention or an article provided therewith is excellent in antifouling properties and is free from deposition of dust, soil or water drops or formation of fur due to such deposition. Even if observed, such deposition or formation can readily be removed, whereby adverse effects resulting from water can be prevented, and cleaning operation can be simplified.

(4) The substrate of the present invention or an article provided therewith has excellent antifouling properties and at the same time has salt water resistance, chemical resistance, abrasion resistance and weather resistance, whereby it is excellent in durability of the antifouling properties, and the antifouling properties can be maintained semipermanently.

The above effects can not be expected by conventional processes, and the present invention is expected to be applicable also in an area where the conventional processes could not be practically used.

What is claimed is:

1. A surface-treated substrate comprising:
   i) a substrate;
   ii) an outermost layer formed by treatment with a surface treating agent comprising compound B of the formula (B):

$$(R^3)_c(R^4)_dSi(NCO)_{4-c-d} \qquad (B)$$

wherein $R^3$ is an organic group, $R^4$ is a hydrogen atom or an organic group, c is 1, 2 or 3 and d is 0, 1, or 2, provided that $1 \leq c+d \leq 3$; and iii) an underlayer which is in contact with said outermost layer formed by treatment with a surface treating agent comprising compound A of formula (A):

$$(R^1)_a(R^2)_bSi(Z)_{4-a-b} \qquad (A); \text{ and}$$

$$Si(NCO)_4$$

wherein $R^1$ is an organic group, $R^2$ is a hydrogen atom or an organic group, a is 1, 2 or 3, b is 0, 1, or 2, provided that $1 \leq a+b \leq 3$ and Z are independently an isocyanate group or a hydrolyzable group,
wherein the weight ratio of compound A to $Si(NCO)_4$ is from 95/5 to 40/60.

2. The surface-treated substrate according to claim 1, wherein at least one of Z is an isocyanate group.

3. The surface-treated substrate according to claim 1, wherein all of Z are isocyanate groups.

4. The surface-treated substrate of claim 1, wherein said an organic group is a hydrocarbon or an organic group containing a halogen atom.

5. The surface-treated substrate of claim 1, wherein said organic group contains a halogen atom selected from the group consisting of chlorine, fluorine, bromine, and a mixture thereof.

6. The surface-treated substrate of claim 1, wherein said organic group is selected from the group consisting of a chloroalkyl group, a fluoroalkyl group and a chlorofluoroalkyl group.

7. The surface-treated substrate of claim 1, wherein said organic group is a polyfluoroorganic group.

8. A process for producing a surface-treated substrate comprising the sequential steps of:

i) forming a treated surface by treating a surface of a substrate with a surface treating agent comprising compound A of formula (A):

$$(R^1)_a(R^2)_b Si(Z)_{4-a-b} \quad (A); \text{ and}$$

$$Si(NCO)_4$$

wherein $R^1$ is an organic group, $R^2$ is a hydrogen atom or an organic group, a is 1, 2 or 3, b is 0, 1, or 2, provided that $1 \leq a+b \leq 3$ and Z are independently an isocyanate group or a hydrolyzable group, wherein the weight ratio of compound A to $Si(NCO)_4$ is from 95/5 to 40/60, and ii) treating said treated surface with a surface treating agent comprising compound B of the formula (B):

$$(R^3)_c(R^4)_d Si(NCO)_{4-c-d} \quad (B)$$

wherein $R^3$ is an organic group, $R^4$ is a hydrogen atom or an organic group, c is 1, 2 or 3 and d is 0, 1, or 2, provided that $1 \leq c+d \leq 3$.

9. The process for producing a surface-treated substrate according to claim 8, wherein at least one of Z is an isocyanate group.

10. The process for producing a surface-treated substrate according to claim 8, wherein all of Z are isocyanate groups.

11. The process of claim 8, wherein said an organic group is a hydrocarbon or an organic group containing a halogen atom.

12. The process of claim 8, wherein said organic group contains a halogen atom selected from the group consisting of chlorine, fluorine, bromine, and a mixture thereof.

13. The process of claim 8, wherein said organic group is selected from the group consisting of a chloroalkyl group, a fluoroalkyl group and a chlorofluoroalkyl group.

14. The process of claim 8, wherein said organic group is a polyfluoroorganic group.

* * * * *